BURLEIGH H. LEACH
KENNETH JAMES
INVENTORS

ATTORNEY

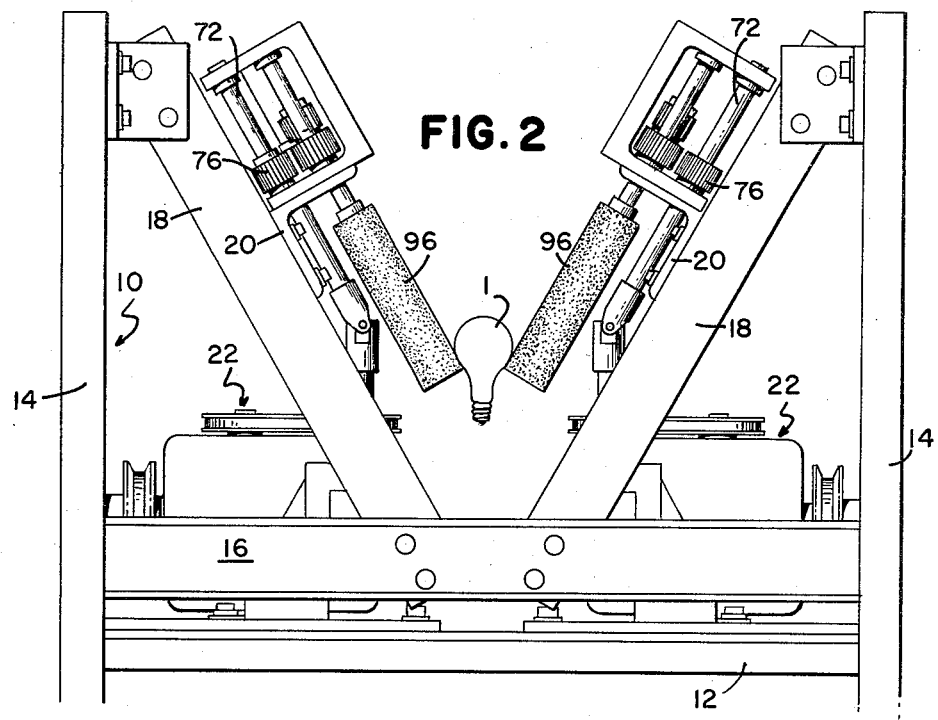
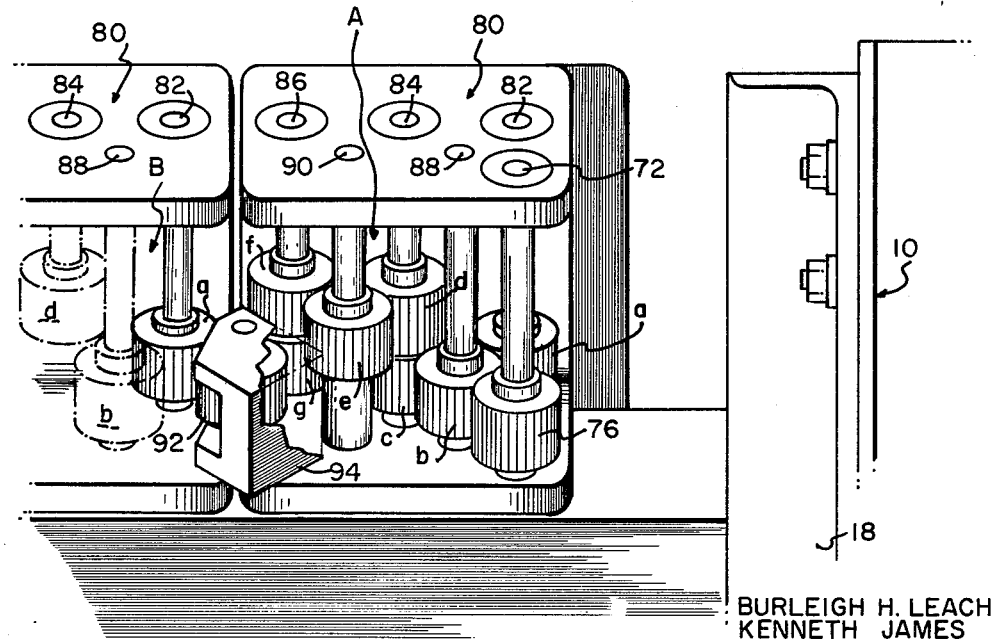

United States Patent Office 3,220,533
Patented Nov. 30, 1965

3,220,533
ARTICLE ORIENTING APPARATUS
Burleigh H. Leach, Hamilton, and Kenneth James, Melrose, Mass., assignors to Sylvania Electric Products Inc., a corporation of Delaware
Filed Feb. 10, 1964, Ser. No. 343,895
2 Claims. (Cl. 198—33)

This invention relates to article orienting apparatus and more particularly to means for unscrambling a plurality of randomly-oriented articles and arranging them in a uniformly oriented disposition.

In the specific embodiment and application of the apparatus of this invention, incandescent lamps are the articles of work. However, it will be readily appreciated by those skilled in the art that the apparatus of this invention and its principles of operation may readily be employed with other articles of work.

In the manufacture of incandescent electric lamps today, most of the manufacturing equipment is designed to operate at very high speeds. In high speed operations involving a number of manufacturing steps, it is necessary to employ article-handling devices which are accurate, efficient, possess a high degree of reliability and function quickly and surely.

In some circumstances it is the practice, upon completion of the last manufacturing step in the manufacturing of incandescent lamps, to hold the lamps for a period of several hours or more before the final quality check is made and the lamps are packaged. In these circumstances, the finished lamps are usually collected in large containers and they are randomly-oriented with respect to one another. However, when the final quality check is to be made and those lamps which pass final inspection are to be packaged, these randomly-oriented lamps must be re-organized so that they are arranged to flow in a uniformly oriented manner to the quality check point and the subsequent packaging operations.

In view of the foregoing, one of the principal objects of this invention is to provide an apparatus for uniformly orienting randomly disposed lamps and advancing them sequentially to a discharge locus or check point at speeds comparable to the speeds with which modern lamp manufacture equipment is operated today.

This and other objects, advantages and features are attained in accordance with the principles of our invention by causing the randomly-oriented lamps to flow through a bottomless, trough-like work area having a pair of side walls defined by a plurality of converging rollers between which the lamps are caused to pass to effect their orientation.

In the specific embodiment of this invention illustrated in the accompanying drawings, FIGURE 1 is a side elevational view of an article orienting apparatus showing the plurality of rollers which define the side walls of the trough-like work area, the drive therefor, and the gear train through which the rollers are driven.

FIGURE 2 is an end elevational view of the article arienting apparatus showing particularly the disposition of the converging rollers which define the side walls of the bottomless, trough-like work area through which the articles of work are caused to pass.

FIGURE 3 is an enlarged detail of a portion of the gear train through which the rollers are driven.

Figure 1:
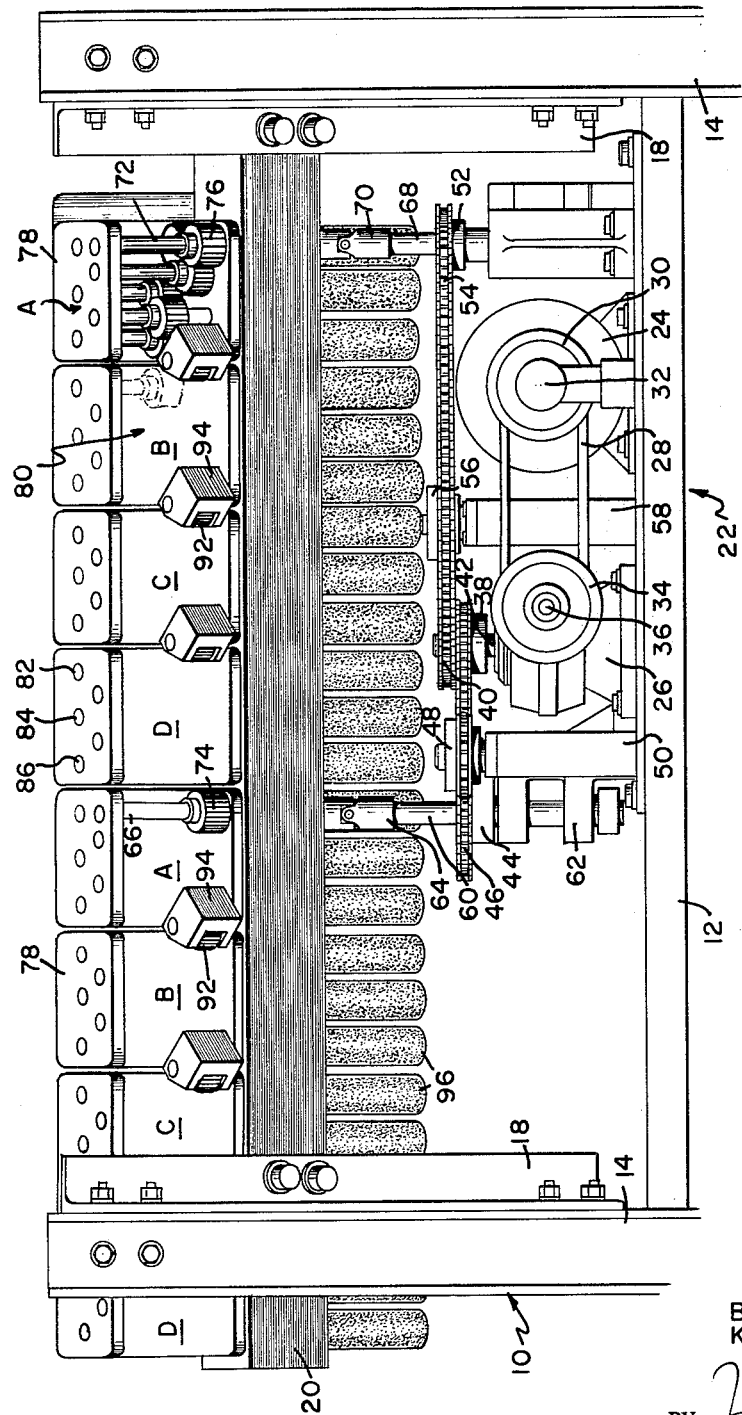

The basic components of the article orienting apparatus illustrated in the accompanying drawings are organized about and supported by a frame 10. As shown in FIGURES 1 and 2, the frame 10 comprises a base 12, sides 14 and crossbraces 16. The frame 10 also includes angularly disposed supports 18 and mounting plates 20 which extend between the angularly disposed supports 18.

Referring now particularly to FIGURE 1, a drive 22 is supported on the base 12 of the frame 10. The drive 22 comprises a motor 24, a gear reduction unit 26 and a belt 28 connected therebetween by means of pulley 30 on motor shaft 32 and pulley 34 on shaft 36 of the gear reduction unit 26. A pair of sprockets 38 and 40 are mounted on the output shaft 42 of the gear reduction unit 26. As will be described in more detail below, two separate roller drives are taken off the output shaft 42, one through the sprocket 38 and the other through sprocket 40. Sprocket 38 drives large sprocket 44 through chain 46. The chain 46 meshes with idler sprocket 48 which is supported on standard 50 on base 12. Sprocket 40 drives small sprocket 52 through chain 54. Chain 54 meshes with idler sprocket 56 which is supported on standard 58 on base 12. The large sprocket 44 is keyed to a lower drive shaft 60 which is supported in a bracket 62 attached to the standard 50. The lower drive shaft 60 is connected through universal joint 64 to an upper drive shaft 66. Similarly, the small sprocket 52 is keyed to a lower drive shaft 68 which is connected through universal joint 70 to an upper drive shaft 72.

As shown in FIGURE 1, a drive gear 74 is keyed to upper drive shaft 66 and a drive gear 76 is keyed to upper drive shaft 72. The upper end of the upper drive shaft 66 is rotatably supported in a bracket 78 which is mounted on mounting plate 20. The upper drive shaft 72 is similarly supported, i.e., in a bracket 78 secured to mounting plate 20.

The drive gears 74 and 76 each have a gear train associated therewith. A portion of the gear train associated with the drive gear 76 is illustrated in FIGURE 1 and has been identified by the general reference number 80. Each gear train comprises four units, A, B, C, and D, one of which is shown in FIGURE 1. Each of these units in turn comprises meshed gearing on three roller shafts 82, 84, and 86, and two idler shafts 88 and 90 as shown in detail in FIGURE 3. An idler gear 92, supported in a gear housing 94, provides the means through which motion is transferred along the gear train 80 between the four units thereof. A gear train similar to the one just described is associated with the drive gear 74. Each of these gear trains is designed to provide for diminishing speed in the direction moving away from the drive gear, i.e., moving from right to left in FIGURE 1. Although the two gear trains are driven from a common drive, one through lower drive shaft 60 and the other through lower drive shaft 68, it will be remembered that the former shaft is fitted with the larger sprocket 44 and thus the drive gear 74 is driven at a slower speed than the drive gear 76. The decreasing speed of the gear train 80 is designed so that the lowest speed at the end thereof is slightly faster than the input speed of the other gear train driven by the drive gear 74. Thus, the two gear trains provide for a gradual decrease in speed along the entire path thereof from right to left in FIGURE 1.

One of the gear train units of gear train 80 will now be described in detail, reference being made particularly to FIGURE 3. As illustrated therein, the roller shafts 82, 84, and 86 and the idler shafts 88 and 90 are all provided with one or more gears. More particularly, the roller shaft 82 is provided with a gear $a$ having twenty-two teeth. The idler shaft 88 is provided with a gear $b$ which has twenty-five teeth. The gear $b$ on idler shaft 88 meshes with the previously described drive gear 76 on the upper drive shaft 72 and lower gear $c$ on roller shaft 84, gear $c$ having twenty-two teeth. The roller shaft 84 is also provided with an upper gear $d$ which has twenty teeth. The upper gear $d$ on roller shaft 84 meshes with gear $e$ on idler shaft 90, the gear $e$ having twenty-six teeth. Gear $e$ on idler shaft 90, meshes with the upper gear $f$ on roller shaft 86, gear $f$ having twenty-two teeth. The roller shaft 86 is also provided with a lower gear $g$ which has twenty teeth. The lower gear g on roller shaft 86 is the last gear in the unit A of gear train 80. This lower gear g on roller shaft 86 meshes with idler gear 92 in gear housing 94. The idler gear 92 defines the means through which the rotational movement is transmitted from unit A to unit B. The idler gear 92, which has twenty-six teeth, meshes with gear a in unit B of the gear train.

The assemblage of the roller shafts, idler shafts and gearing in units B, C, and D are the same as those just described in detail in unit A, the only difference being that the input to units B, C and D is an idler gear 92 whereas the input to unit A is the drive gear 76. It will be readily appreciated by those skilled in the art that various modifications and changes can readily be made in the gear train depending upon the increase or decrease in speed which is desired in any given application. As illustrated in the accompanying drawings, we have found it advantageous in this particular application to use a pair of gear trains, each having four units A, B, C, and D on each side of the trough-like work area through which the articles of work are caused to pass. As illustrated in FIGURE 2, separate drives 22 are provided for the pair of gear trains 80 on each side of the trough-like work area. FIGURE 2 also illustrates particularly how converging rollers 96 support a lamp 1 therebetween. As illustrated in FIGURE 1, each of the roller shafts 82, 84, and 86 in each of the units A, B, C, and D of each gear train 80 is provided with a roller 96 which is preferably provided with a covering of resilient material to permit the handling of fragile articles of work without the danger of substantial breakage.

In the operation of the apparatus of this invention, a plurality of randomly oriented lamps is dumped into the trough-like work area at the left hand end thereof as viewed in FIGURE 1. The rotating rollers 96 displace and unscramble the mass of lamps, advancing them through the trough-like work area from left to right as viewed in FIGURE 1. By the time that the lamps have reached the end of this travel, the rotating rollers have caused them to line up, single file, base down as shown in FIGURE 2. A suitable article transfer apparatus is located adjacent to the discharge end of the article orienting apparatus to remove oriented lamps therefrom and present them to a quality testing unit or a packaging machine. As indicated above in the detailed description of the gear trains, the speed of rotation of the rollers 96 diminishes from right to left in FIGURE 1. Since the lamps are moving in the opposite direction, i.e., from left to right in FIGURE 1, the lamps are moved through the trough-like work area with increasing speed as they are advanced toward the discharge end thereof.

In the specific embodiment of the apparatus of this invention illustrated in the accompanying drawings and described above, two separate drive systems are employed, both driven at about the same speed. However, it will be readily appreciated by those skilled in the art that a single drive may be employed or the two separate drives may be driven at substantially different speeds thereby providing for signficant rotational forces to be applied to the articles of work if such is desired. These and other modifications will of course suggest themselves depending upon the nature of the articles of work, the speed with which it is desired to effect the article orienting operation and other like considerations.

What we claim is:

1. Apparatus for orienting randomly disposed articles, said apparatus comprising: a trough-like structure, the bottom of which is open and the longitudinal sides of which comprise a plurality of rollers converging at their lower ends whereby said articles to be oriented may be supported by said converging rollers with the lower extremities of the articles extending through said open bottom; and gear train means for driving said rollers at a varying speed along the length of said trough-like structure whereby randomly oriented articles, deposited in said trough-like structure at one end thereof will, by the said action of said rollers, be re-arranged in a uniform orientation as they emerge from the other end of said trough-like structure.

2. Apparatus for orienting randomly disposed articles, said apparatus comprising: a trough-like structure, the bottom of which is open and the longitudinal sides of which comprise a plurality of rollers converging at their lower ends whereby said articles to be oriented may be supported by said converging rollers with the lower extremities of the articles extending through said open bottom; and a pair of gear trains, disposed in operative relationship with respect to each longitudinal side of said trough-like structure, for driving said rollers at a varying speed along the length of said trough-like structure whereby randomly oriented articles deposited in said trough-like structure at one end thereof will, by the said action of said rollers, be re-arranged in a uniform orientation as they emerge from the other end of said trough-like structure.

References Cited by the Examiner

UNITED STATES PATENTS

| 2,765,065 | 10/1956 | Liebelt | 198—34 |
| 2,781,119 | 2/1957 | Talbot et al. | 198—29 |
| 3,142,374 | 7/1964 | Carter | 198—34 X |

HUGO O. SCHULZ, *Primary Examiner.*

SAMUEL F. COLEMAN, *Examiner.*